US009561676B2

(12) United States Patent
Sakellarides et al.

(10) Patent No.: US 9,561,676 B2
(45) Date of Patent: *Feb. 7, 2017

(54) BIAXIALLY ORIENTED BIO-BASED POLYESTER THIN FILMS AND LAMINATES FOR THERMAL TRANSFER PRINTING

(71) Applicant: TORAY PLASTICS (AMERICA), INC., N. Kingstown, RI (US)

(72) Inventors: Stefanos L. Sakellarides, East Greenwich, RI (US); Milan William Moscaritolo, Westerly, RI (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,434

(22) Filed: Dec. 23, 2013

(65) Prior Publication Data
US 2014/0113132 A1   Apr. 24, 2014

Related U.S. Application Data

(63) Continuation-in-part of application No. 13/874,141, filed on Apr. 30, 2013, which is a continuation-in-part of application No. 13/179,007, filed on Jul. 8, 2011.

(51) Int. Cl.
*B41M 5/41* (2006.01)
*B32B 15/09* (2006.01)
(Continued)

(52) U.S. Cl.
CPC ............ *B41J 31/04* (2013.01); *B29C 47/0057* (2013.01); *B29C 47/065* (2013.01); *B29C 47/92* (2013.01);
(Continued)

(58) Field of Classification Search
CPC .......... B41M 5/41; B32B 15/09; B32B 27/36; C08G 63/18; C08G 63/183; C08J 11/04; C08J 2367/02; B29K 2995/0056; B29K 2067/003; Y10T 428/31786
(Continued)

(56) References Cited

U.S. PATENT DOCUMENTS 3,903,294 A   9/1975 Abella
4,011,358 A   3/1977 Roelofs
(Continued)

FOREIGN PATENT DOCUMENTS

CN   102582294   7/2012
JP   7-268189   10/1995
(Continued)

OTHER PUBLICATIONS

Sakellarides et al., U.S. Office Action mailed Aug. 28, 2014, directed to U.S. Appl. No. 13/874,141; 9 pages.
(Continued)

*Primary Examiner* — Bruce H Hess
(74) *Attorney, Agent, or Firm* — Morrison & Foerster LLP

(57) ABSTRACT

A bio-based polyester thin film substrate for thermal transfer printing ribbon. The bio-based polyester thermal transfer ribbon substrate film has a radiocarbon content of at least 12 pMC. The film exhibits excellent uniformity, handling, and processability, substantially equivalent to petroleum-based counterparts, while being derived wholly or partly from non-petroleum sources.

26 Claims, 1 Drawing Sheet

Thermal Transfer Printing

(51) Int. Cl.

| | | |
|---|---|---|
| B32B 27/36 | (2006.01) | |
| C08J 11/04 | (2006.01) | |
| C08G 63/183 | (2006.01) | |
| B41J 31/04 | (2006.01) | |
| B29D 7/01 | (2006.01) | |
| B29C 47/06 | (2006.01) | |
| B32B 27/06 | (2006.01) | |
| B32B 27/18 | (2006.01) | |
| B29C 47/92 | (2006.01) | |
| B29C 55/02 | (2006.01) | |
| B29C 55/06 | (2006.01) | |
| B29C 55/08 | (2006.01) | |
| B29C 55/10 | (2006.01) | |
| B29C 55/14 | (2006.01) | |
| C08J 5/18 | (2006.01) | |
| B32B 7/12 | (2006.01) | |
| B29C 47/00 | (2006.01) | |
| B29L 31/00 | (2006.01) | |
| B29K 67/00 | (2006.01) | |
| B29K 105/26 | (2006.01) | |

(52) U.S. Cl.
CPC .......... *B29C 55/023* (2013.01); *B29C 55/065* (2013.01); *B29C 55/085* (2013.01); *B29C 55/10* (2013.01); *B29C 55/143* (2013.01); *B29C 55/146* (2013.01); *B29D 7/01* (2013.01); *B32B 7/12* (2013.01); *B32B 15/09* (2013.01); *B32B 27/06* (2013.01); *B32B 27/18* (2013.01); *B32B 27/36* (2013.01); *B41M 5/41* (2013.01); *C08J 5/18* (2013.01); *B29C 47/0004* (2013.01); *B29C 47/0021* (2013.01); *B29C 47/0066* (2013.01); *B29C 2947/92704* (2013.01); *B29K 2067/003* (2013.01); *B29K 2105/26* (2013.01); *B29K 2995/0056* (2013.01); *B29L 2031/744* (2013.01); *B32B 2272/00* (2013.01); *B32B 2307/4026* (2013.01); *B32B 2307/518* (2013.01); *B32B 2307/704* (2013.01); *B32B 2439/70* (2013.01); *C08J 2367/02* (2013.01); *Y02P 20/582* (2015.11); *Y10T 428/28* (2015.01); *Y10T 428/2848* (2015.01); *Y10T 428/31786* (2015.04)

(58) Field of Classification Search
USPC ............. 503/227; 428/32.6–32.87, 32.5, 327
See application file for complete search history.

(56) References Cited

U.S. PATENT DOCUMENTS

| | | |
|---|---|---|
| 4,077,588 A | 3/1978 | Hurst |
| 4,290,763 A | 9/1981 | Hurst |
| 4,322,003 A | 3/1982 | Long |
| 4,375,494 A | 3/1983 | Stokes |
| 4,636,442 A | 1/1987 | Beavers et al. |
| 4,704,325 A | 11/1987 | Crocker |
| 4,778,431 A | 10/1988 | Dudley |
| 4,917,646 A | 4/1990 | Kieves |
| 5,108,339 A | 4/1992 | Kieves |
| 5,145,833 A | 9/1992 | Prunier, Jr. et al. |
| 5,164,248 A | 11/1992 | Fleury et al. |
| 5,209,972 A | 5/1993 | Super et al. |
| 5,338,243 A | 8/1994 | Kieves |
| 5,458,965 A | 10/1995 | Yoshinaka et al. |
| 5,616,496 A | 4/1997 | Frost et al. |
| 5,713,777 A | 2/1998 | Greenwald |
| 5,770,301 A | 6/1998 | Murai et al. |
| 5,853,862 A | 12/1998 | Murai et al. |
| 5,856,017 A | 1/1999 | Matsuda et al. |
| 5,882,747 A | 3/1999 | Bria et al. |
| 5,935,903 A * | 8/1999 | Goss ................. B41M 5/41 427/146 |
| 5,942,320 A | 8/1999 | Miyake et al. |
| 5,958,552 A | 9/1999 | Fukuda et al. |
| 6,034,813 A | 3/2000 | Woodard et al. |
| 6,103,368 A | 8/2000 | Fukuda et al. |
| 6,188,512 B1 | 2/2001 | Woodard et al. |
| 6,194,054 B1 | 2/2001 | Peiffer et al. |
| 6,214,440 B1 | 4/2001 | Peiffer et al. |
| 6,221,112 B1 | 4/2001 | Snider |
| 6,221,191 B1 | 4/2001 | Davis et al. |
| 6,291,053 B1 | 9/2001 | Peiffer et al. |
| 6,303,228 B1 | 10/2001 | Watanabe et al. |
| 6,391,410 B1 | 5/2002 | Peiffer et al. |
| 6,416,872 B1 | 7/2002 | Maschwitz |
| 6,436,544 B1 | 8/2002 | Veyrat et al. |
| 6,455,141 B1 | 9/2002 | Woodard et al. |
| 6,543,208 B1 | 4/2003 | Kobayashi et al. |
| 6,607,815 B2 | 8/2003 | Bartsch et al. |
| 6,743,512 B2 | 6/2004 | Murata et al. |
| 6,803,113 B2 | 10/2004 | Porter et al. |
| 7,115,320 B2 | 10/2006 | Tanaka et al. |
| 7,238,401 B1 | 7/2007 | Dietz |
| 7,799,399 B2 | 9/2010 | Sargeant et al. |
| 7,919,158 B2 | 4/2011 | Seth et al. |
| 2001/0019759 A1 | 9/2001 | Barattucci et al. |
| 2002/0094396 A1 | 7/2002 | Ward et al. |
| 2002/0182389 A1 | 12/2002 | Döbler |
| 2004/0076821 A1 | 4/2004 | Janssens et al. |
| 2004/0166337 A1 | 8/2004 | Chang et al. |
| 2005/0119359 A1 | 6/2005 | Shelby et al. |
| 2005/0208282 A1 | 9/2005 | Wood, Jr. et al. |
| 2009/0022919 A1 | 1/2009 | Chicarella et al. |
| 2009/0226991 A1 | 9/2009 | Feldman et al. |
| 2009/0246430 A1 | 10/2009 | Kriegel et al. |
| 2009/0323180 A1 | 12/2009 | Weber et al. |
| 2010/0028512 A1 | 2/2010 | Kriegel et al. |
| 2010/0068493 A1 | 3/2010 | Jesberger et al. |
| 2010/0314243 A1 | 12/2010 | Frost et al. |
| 2011/0076733 A1 | 3/2011 | Urano et al. |
| 2011/0087000 A1 | 4/2011 | Peters et al. |
| 2011/0120902 A1 | 5/2011 | Boswell et al. |
| 2011/0287199 A1 | 11/2011 | Chicarella et al. |
| 2011/0287200 A1 | 11/2011 | Chicarella et al. |
| 2013/0344264 A1 | 12/2013 | Chicarella et al. |
| 2013/0344345 A1 | 12/2013 | Sakellarides et al. |
| 2014/0004286 A1 | 1/2014 | Sakellarides et al. |

FOREIGN PATENT DOCUMENTS

| | | |
|---|---|---|
| WO | WO-89/08558 | 9/1989 |
| WO | WO-2004/016417 | 2/2004 |

OTHER PUBLICATIONS

Sakellarides et al., U.S. Office Action mailed Nov. 14, 2014, directed to U.S. Appl. No. 13/535,153; 11 pages.

Chicarella et al., U.S. Office Action mailed Dec. 24, 2014, directed to U.S. Appl. No. 13/729,805, 14 pages.

Sargeant et al., U.S. Office Action mailed Jun. 27, 2007, directed to U.S. Appl. No. 11/651,103; 9 pages.

Sargeant et al., U.S. Office Action mailed Dec. 21, 2007, directed to U.S. Appl. No. 11/651,103; 8 pages.

Sargeant et al., U.S. Office Action mailed Jul. 10, 2008, directed to U.S. Appl. No. 11/651,103; 11 pages.

Sargeant et al., U.S. Office Action mailed Jun. 1, 2009, directed to U.S. Appl. No. 11/651,103; 15 pages.

Sargeant et al., U.S. Office Action mailed Feb. 22, 2010, directed to U.S. Appl. No. 11/651,103; 8 pages.

Chicarella et al., U.S. Office Action mailed Jan. 23, 2012, directed to U.S. Appl. No. 13/196,495; 6 pages.

Chicarella et al., U.S. Office Action mailed Dec. 23, 2011, directed to U.S. Appl. No. 13/196,554; 6 pages.

Chicarella et al., U.S. Office Action mailed Aug. 19, 2011, directed to U.S. Appl. No. 12/202,655; 6 pages.

(56) References Cited

OTHER PUBLICATIONS

Chicarella et al., U.S. Office Action mailed Mar. 5, 2012, directed to U.S. Appl. No. 12/202,655; 5 pages.
Chicarella et al., U.S. Office Action mailed Oct. 4, 2012, directed to U.S. Appl. No. 12/202,655; 6 pages.
Sakellarides et al., U.S. Office Action mailed Sep. 17, 2012, directed to U.S. Appl. No. 13/179,007; 10 pages.
Sakellarides et al., U.S. Office Action mailed Apr. 12, 2013, directed to U.S. Appl. No. 13/179,007; 14 pages.
Sakellarides et al., U.S. Office Action mailed Sep. 17, 2013, directed to U.S. Appl. No. 13/179,007; 11 pages.
Sakellarides et al., U.S. Office Action mailed Jul. 23, 2013, directed to U.S. Appl. No. 13/535,153; 10 pages.
Sakellarides et al., U.S. Office Action mailed Dec. 24, 2013, directed to U.S. Appl. No. 13/535,153; 13 pages.
International Search Report and Written Opinion, dated Oct. 26, 2007, directed to International Application No. PCT/US07/13164; 9 pages.
Extended European Search Report mailed Nov. 17, 2011, directed to EP Application No. 07777400.8; 8 pages.
Office Action mailed Feb. 23, 2011, directed to MX Application No. MX/a/2008/015570; 2 pages.
"Explanation of Results—Biobased Analysis using ASTM D6866-08," located at <http://www.betalabservices.com/PDF/ASTM-D6866-Example-Report-JP.pdf>. (6 pages) (With English Translation).
"Thermal Transfer Printing," located at <http://en.wikipedia.org/wiki/Thermal_transfer_printing> visited on Apr. 8, 2014. (2 pages).
LaPorte, G. M. et al. (2003). "The Forensic Analysis of Thermal Transfer Printing," *Journal of Forensic Sciences*, 48(5): 1163-1171.
Roerink, F. (Feb. 15, 2011). "Avantium's YXY: Green Materials and Fuels," Avantium Presentation at 2nd Annual Next Generation Bio-Based Chemicals Summit: 24 pages.
Furlong, K. (Mar. 28, 2012). "Commercializing BioFormPX($_{TM}$)," *Virent Presentation at BioPlastek 2012*: 30 pages.
Huang, S. (Mar. 28, 2012). "Coca-Cola's Roadmap Towards 100% Renewable Packaging," *Coca-Cola Presentation at BioPlastek 2012*: 30 pages.
Julian, A. (Jun. 2011). "Transforming an Industry—Capturing the Promise of 100% Bio-based Polymers," Draths Corporation Presentation at BioPlastek 2011: 27 pages.
Bozell, J. J. et al. (Mar. 2010). "Technology Development for the Production of Biobased Products from Biorefinery Carbohydrates—the US Department of Energy's 'Top 10' Revisited," *Green Chemistry* 12(4). 539-554.
Gandini, A. et al. (2009). "The Furan Counterpart of Poly(ethylene terephthalate): An Alternative Material Based on Renewable Resources," *Journal of Polymer Science: Part A Polymer Chemistry* 47(1):295-298.
Robertson, G. L. (1993). "Shelf Life of Packaged Foods, Its Measurement and Prediction," Chapter 13 In *Food Packaging: Principles and Practices*. Marcel Dekker, Inc., 25 pages.
Sakellarides et al., U.S. Office Action mailed May 15, 2014, directed to U.S. Appl. No. 13/179,007; 6 pages.
Sakellarides et al. U.S. Office Action mailed Jun. 1, 2016, directed to U.S. Appl. No. 13/874,141; 8 pages.
Sakellarides et al., U.S. Office Action mailed May 4, 2015, directed to U.S. Appl. No. 13/535,153; 14 pages.
Sakellarides et al., U.S. Office Action mailed May 20, 2015, directed to U.S. Appl. No. 13/874,141; 11 pages.

\* cited by examiner

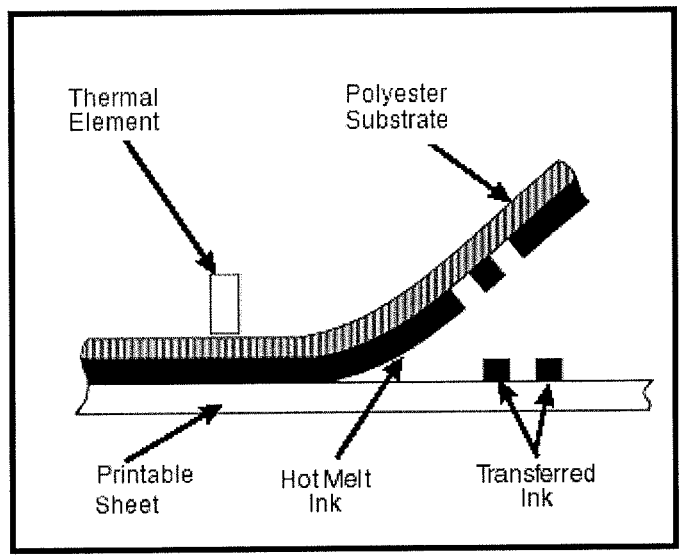
Thermal Transfer Printing

BIAXIALLY ORIENTED BIO-BASED POLYESTER THIN FILMS AND LAMINATES FOR THERMAL TRANSFER PRINTING

CROSS-REFERENCE TO RELATED APPLICATION

This application is a continuation-in-part of U.S. patent application Ser. No. 13/874,141, filed Apr. 30, 2013, which is a continuation-in-part of U.S. patent application Ser. No. 13/179,007, filed Jul. 8, 2011, the contents of which are incorporated herein by reference in their entireties.

FIELD OF THE INVENTION

This invention relates to biaxially oriented thin films for thermal transfer printing comprising a bio-based polyester such as polyethylene terephthalate (abbreviated as "PET"), which is derived from non-petroleum-sourced monomers. This invention also relates to multi-layer biaxially oriented polyester films and laminates for thermal transfer printing ribbons (abbreviated as "TTR" films) which are made from at least one bio-based polyester building block, such as bio-based ethylene glycol or bio-based terephthalic acid.

BACKGROUND OF THE INVENTION

Biaxially oriented polyester films are used for a variety of purposes including packaging, industrial, electronic, decorative, label, and imaging applications and often perform multiple functions. For example, biaxially oriented PET films and laminations are popular, high performing, and cost-effective flexible substrates for a variety of film structures used in thermal transfer printing, such as transferring ink to substrates by thermal sublimation.

These films may, for example, be used as a thermal transfer ribbon. The films, for example, may be used in the printing of barcodes or digital photographs on paper or other suitable recipient substrate.

Thermal transfer printing applies to printing processes that utilize heat in order to produce an image by either physical or chemical means or a combination of both (G. Laporte et al., "The Forensic Analysis of Thermal Transfer Printing", J. Forensic Science, Vol. 48, No. 5 (2003)). Its predominance has evolved in the past three decades with the advent of bar coding, retailer receipts, fax machines, event tickets, high resolution digital photography and plastic identification cards.

Thermal transfer printing is a digital printing process in which material is applied to paper (or some other material) by melting a coating of ribbon so that it stays glued to the material on which the print is applied. FIG. 1 shows an example of a thermal transfer printing process.—(Based on Image from Wikipedia "Thermal Transfer Printing", http://en.wikipedia.org/wiki/Thermal_transfer_printing). In its simplest form the ribbon is formed from a polymeric substrate and at least one layer of ink coating. As the ribbon moves over the print head, resistive elements on the print head get heated, which causes the ink to melt. As the ink becomes molten, it releases from the substrate film and transfers onto the receiver (print surface). Release happens either via ink sublimation ("dye diffusion thermal transfer" D2T2) or by means of a wax carrier ("thermal mass transfer, TMT). The used ribbon separates from the receiver and is wound up on a take-up spindle.

Spent ribbons constitute a significant waste in the thermal transfer ribbon process. Accordingly, some references have described ribbon recycling methods. See, for example, Chinese patent application CN102582294A. However, these recycling methods show that the complex structure of the thermal transfer ribbon makes it difficult and uneconomical to recycle and recover the polyester component once the ribbons are spent. As a result they end-up usually disposed of by incineration or thrown into a landfill resulting in significant carbon footprint.

Coca-Cola Company's U.S. Patent Application Pub. No. 2009-0246430 A1 states that "It is known in the art that carbon-14 (C-14), which has a half-life of about 5,700 years, is found in bio-based materials but not in fossil fuels. Thus, "bio-based materials" refers to organic materials in which the carbon comes from non-fossil biological sources. Examples of bio-based materials include, but are not limited to, sugars, starches, corns, natural fibers, sugarcanes, beets, citrus fruits, woody plants, cellulosics, lignocelluosics, hemicelluloses, potatoes, plant oils, other polysaccharides such as pectin, chitin, levan, and pullulan, and a combination thereof. The detection of C-14 is indicative of a bio-based material. C-14 levels can be determined by measuring its decay process (disintegrations per minute per gram carbon or dpm/gC) through liquid scintillation counting. This reference also teaches the use of bio-based ethylene glycols and terephthalic acids to form a bio-based polyethylene terephthalate resin useful for beverage bottles.

U.S. Patent Application Publication No. 2010-0028512 A1 describes a method to produce bio-based polyester terephthalate (PET) resin which may then be used to make articles, containers, or packaging for food and beverage products. The application also discloses the use of bio-based polyethylene to produce closures, caps, or lids for bio-based PET containers as well as the use of bio-based polyethylene labels via film extrusion for said containers. However, there is no contemplation of producing bio-based polyethylene terephthalate films for thermal transfer ribbon applications.

SUMMARY OF THE INVENTION

Described are methods for producing films and laminations using bio-based polyethylene terephthalate homopolymers and copolymers for thermal transfer ribbon applications and films and laminations produced using such methods. Such bio-based polyester articles contain a certain amount of $^{14}$C-isotope. These bio-based polyesters articles are made from bio-based monomers, which are derived from plant-based intermediates such as alcohols and sugars. These methods, films and laminations address issues encountered when making thermal transfer ribbon films and laminations from bio-based polyesters such as bio-based polyethylene terephthalate homopolymers and copolymers. The inventors have found solutions whereby the use of such materials in thermal transfer ribbon applications can maintain current levels of quality, processability, and capital assets while reducing net carbon dioxide emissions. The term "bio-based" used herein is taken to include polymers derived either totally or partially from bio-based sources. Bio-based polyethylene terephthalate or other polyesters differ from conventional petroleum-based polyesters in that $^{14}$C-isotope measurements show that the quantity of $^{14}$C in bio-sourced materials is significantly higher than in petroleum-based materials due to the continual uptake of this isotope by living plants and organisms. In petroleum-derived polyethylene terephthalate, however, $^{14}$C-isotope is essentially undetected using ASTM International standards (ASTM D6866). This is due to the half-life of $^{14}$C (about 5730±40 years) and the decay of this isotope over the hundreds of millions of years since the original organisms existed, took up said $^{14}C$, and turned into petroleum. Thus, bio-based or bio-sourced polyesters may be characterized by the amount of $^{14}C$ they contain. The decay of $^{14}C$ isotope is famously known for radiocarbon-dating of archeological, geological, and hydrogeological artifacts and samples and is based on its activity of about 14 disintegrations per minute (dpm) per gram carbon.

Embodiments of a substrate composite film for thermal transfer printing may include a biaxially oriented base layer including polyester and lubricant particles. Embodiments of a film structure for thermal transfer printing may include a biaxially oriented base film including polyester, and lubricant particles, an adhesive layer on a surface of the biaxially oriented base layer; a colored dye coating on the adhesive layer; and a low friction coating on a surface of the biaxially oriented base layer opposite the adhesive layer.

One embodiment is a laminate film including a first bio-based polyester resin-containing layer B, said bio-based polyester selected from the group of polyethylene terephthalate, polyethylene naphthalate, polybutylene terephthalate, polytrimethylene terephthalate, polyethylene terephthalate-co-isophthalate copolymer, polyethylene terephthalate-co-naphthalate copolymer, polycyclohexylene terephthalate, polyethylene-co-cyclohexylene terephthalate, etc. and other ethylene glycol or terephthalic acid-based polyester homopolymers and copolymers and blend combinations thereof. This first bio-based polyester resin-containing layer B could be considered a base or core layer.

One particular embodiment of such a film-forming polyester is polyethylene terephthalate (abbreviated as "PET") homopolymer or copolymer with one or both of its major monomer building blocks, terephthalic acid or ethylene glycol, derived from biological sources. Such films exhibit excellent properties, including mechanical and physical properties substantially equivalent to their petroleum-based counterparts, while being derived wholly or partly from non-petroleum sources.

Layer B can also be blended with appropriate PET recycle, which can be both industrial (self) recycled and external post-consumer recycled, which (especially the latter) does not necessarily have to be bio-based.

The bio-based content of the polyester can be characterized using test procedure ASTM D6866 which measures the amount of $^{14}C$ isotope (also known as "radiocarbon") in said polyester and compares it to a modern reference standard. This ratio of measured $^{14}C$ to the standard can be reported as "percent modern carbon" (pMC). Petroleum or fossil fuel-based polyester will have essentially 0% radiocarbon (0 pMC) whereas contemporary 100% bio-based or bio-mass polyester should have about or near 100% radiocarbon (105.35 pMC). It is preferable that the content of biomass-based polyester in layer B be at least 1 pMC, and more preferably about 12 pMC, and even more preferably, about 105.3 pMC.

In a further embodiment, the laminate could comprise a second polyester resin-containing layer A contiguously attached upon one side of the first bio-based polyester resin-containing layer B. This second polyester resin-containing layer A could, for example, be either a petroleum-based polyester or a bio-based polyester like the first layer B. Preferably, this second layer A is also a bio-based polyester resin-containing layer of at least 1.0 pMC, preferably at least about 18 pMC, and more preferably, about 105.3 pMC. This layer can provide a suitable substrate, free of recycle content, which may introduce variability that may affect coating performance, for applying the coating described in the following paragraph.

Furthermore, the laminate could further embody a coating layer contiguously attached on the side of the first bio-based polyester resin-containing core layer B, opposite the second polyester resin-containing A, or, in case there is no additional layer A, to the side of layer B opposite a color layer is subsequently applied. The purpose of the coating layer may be to facilitate better performance against film wrinkling interfering with image quality, and to prevent excessive printing machine print head abrasion. Accordingly, this layer may essentially be a low friction silicone or wax based layer.

In some embodiments, a film for thermal transfer printing includes a biaxially oriented base film including polyester, wherein the polyester in the base film includes bio-based polyester and has a radiocarbon content of at least 12 pMC, preferably at least 18 pMC. The base film may be a single layer film or a multilayer film. The base film may include crystalline polyethylene terephthalate. The base film may include recycled polyester. In some embodiments, the base film may include at least two layers including at least partially bio-based polyester.

In some embodiments, the film may include an adhesive layer on a surface of the base film. The film may include a colored dye coating on the adhesive layer. The film may include a low friction coating on a surface of the base layer opposite the adhesive layer. In some embodiments, the base film includes a first type of lubricant particle and may also include a second type of lubricant particle. In some embodiments, the first type of lubricant particles may have a number average particle diameter 3 to 15 times larger than the second type of lubricant particles. In some embodiments, the base layer may include 0.05 to 0.18 wt. % first type of lubricant particles and 0.02 to 0.15 wt. % second type of lubricant particles. The first type of lubricant particles and/or second type of lubricant particles may include silicon dioxide, calcium carbonate, alumina, kaolin, highly crosslinked polystyrene or silicone particles.

In some embodiments, a film structure for thermal transfer printing includes: a biaxially oriented base film comprising at least partially bio-based polyester, a first type of lubricant particles, and a second type of lubricant particles; an adhesive layer on a surface of the base film; a colored dye coating on the adhesive layer; and a low friction coating on a surface of the biaxally oriented base layer opposite the adhesive layer.

In some embodiments, a method of making a film for thermal transfer printing includes: extruding a base film comprising polyester, wherein the polyester in the base film is comprises bio-based polyester and has a radiocarbon content of at least 12 pMC; and biaxially orienting the base film. The base film may be extruded as a single layer film or coextruded as a multilayer film. In some embodiments, the method may also include applying an adhesive layer as a solution or dispersion to a surface of the base film. In some embodiments, the method may also include applying a colored dye coating onto the adhesive layer. In some embodiments, the method may also include applying a low friction coating on a surface of the base layer opposite the adhesive layer.

In some embodiments, biaxially orienting the base film may include stretching the base film from 2 to 7 times in a longitudinal direction and from 2 to 5 times in a transverse direction.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWING

FIG. 1 is an illustration of a thermal transfer printing process.

DETAILED DESCRIPTION OF THE INVENTION

Described are methods, films and laminations for thermal transfer ribbon applications that can reduce the carbon footprint of thermal transfer ribbon processes. These methods, films and laminations utilize a polyester substrate partially or totally derived from bio-sources instead of petroleum sources. Further reduction in carbon footprint can be achieved by incorporating recycle content in the film production. In some embodiments, the bio-based PET polymer comprises at least about 0.1 dpm/gC (disintegrations per minute per gram carbon) of C-14." This distinguishes the bio-based materials from their traditional petroleum-based counterparts.

In some embodiments, a biaxially oriented polyester film includes at least 19, 21.1, 21.5, or 53.3 pMC, preferably 105.3 pMC, and contains bio-based polyester of about at least 29% or 32%, and preferably, 100% biomass content. The film may include at least a single layer B as a base or core layer. The content or percentage of the film of bio-based origin is determined by comparing the amount of radiocarbon ($^{14}C$ isotope) to a modern reference sample. Radiocarbon (also known as "carbon 14", "C-14", or "$^{14}C$") is a weakly radioactive, naturally occurring element in all living organisms. $^{14}C$ is taken up continuously by the organism (plant or animal) over its lifetime; when the organism dies (or is harvested such as sugar cane or corn or other crops), this $^{14}C$ uptake ceases. Thus, contemporary biomass—or materials and articles made from such biomass—has a significant amount of radiocarbon, typically about 100% radiocarbon. In comparison, fossil fuels such as coal and petroleum oil have typically about 0% radiocarbon. This is because fossil fuels and petroleum were formed hundreds of millions of years in the past from buried plants and algae to form coal and petroleum deposits. The algae and plants from that time period ceased uptake of $^{14}C$ and—as $^{14}C$ has a half-life of about 5730 years, over those 300 million years or so since the original algae and plants died and turned into fossil fuels—the $^{14}C$ isotope in them decayed to the point where such fossil fuels essentially contain zero radiocarbon. By comparing the amount of $^{14}C$ in a bio-based polyester film to a "modern reference standard," this ratio can be representative of a percent biomass content of the film with the units "pMC" (percent modern carbon).

The "modern reference standard" used in radiocarbon dating is a NIST (National Institute of Standards and Technology) standard with a known radiocarbon content equivalent to about the year 1950 AD. The year 1950 was chosen since it was the year that calibration curves for radiocarbon dating were established and also was a useful marker year prior to large-scale thermo-nuclear weapons testing which altered the global ratio of $^{14}C$ to $^{12}C$. This standard represents 100 pMC. Present day (post-1950 AD) articles made from contemporary biomass sources typically show pMC greater than 100 due to the increase of 14C due to nuclear weapons testing (also known as "bomb carbon"). At the time of this writing, contemporary biomass-sourced articles have about 105.3 pMC. Thus, bio-based polyesters, e.g. polyethylene terephthalate using exclusively as diol component ethylene glycol recently derived from sugar cane or corn starches (which were subsequently fermented to ethanol or methanol and converted to ethylene, and then to ethylene oxide and ethylene glycol) and also using exclusively as diacid component terephthalic acid derived from biomass, would show a pMC of about 105.3. Fossil fuel/petroleum-based articles or polyesters would have a pMC of about 0. Thus, conventionally, it has been useful and convenient to assign a value of "100% biomass content" to articles that exhibit about or near 105.3 pMC and "0% biomass content" to articles that exhibit about or near 0 pMC. In this way, one can calculate and assign a percent biomass content to articles that comprise both bio-based carbon and fossil fuel-based carbon. For example, a polyethylene terephthalate film made from a bio-based ethylene glycol source and a conventional (petroleum-based) terephthalic acid would have 20 wt. % bio-sourced carbon atoms (since in the PET repeat unit there are 2 carbon atoms coming from ethylene glycol and 8 carbon atoms coming from terephthalic acid) and would exhibit a pMC of about 21.1. This would equate to about "32% biomass content" for said film (Reference material from Beta Analytic Inc. website www.betalabservices.com "Explanation of Results—Biobased Analysis using ASTM D6866").

In some embodiments, the bio-based film layer B is a crystalline polyethylene terephthalate and can be uniaxially or biaxially oriented. These resins have intrinsic viscosities between 0.60 and 0.85 dl/g, a melting point of about 255-260° C., a heat of fusion of about 30-46 J/g, and a density of about 1.4. The pMC value of these crystalline polyesters is preferably at least about 18 or 21.5 and more preferably about 105.3. The bio-based resin layer B is typically 2 μm to 350 μm in thickness after biaxial orientation, preferably between 3 μm and 50 μm, and more preferably between 3.5 μm and 6.5 μm in thickness.

The layer can further include other additives. Additional preferred additives in the layer may include antiblock and slip additives. These are typically solid particles dispersed within the layer effectively to produce a low coefficient of friction on the exposed surface of the layer. This low coefficient of friction helps the film to move smoothly through the film formation, stretching and wind-up operations. Without such antiblocking and slip additives, the outer surfaces would be more tacky and would more likely cause the film being fabricated to stick to itself and to processing equipment causing excessive production waste and low productivity.

Examples of antiblock and slip additives that may be used for polyester film applications silica particles with mean particle size diameters in the range of 0.0.1-5 μm at concentrations of 0.1-0.4 mass-percent, calcium carbonate particles with a medium particle size of 0.3-1.2 μm at concentrations of 0.03-0.2 mass-percent. Additional examples include inorganic particles, aluminum oxide, magnesium oxide, and titanium oxide, such complex oxides as kaolin, talc, and montmorillonite, such carbonates as calcium carbonate, and barium carbonate, such sulfates as calcium sulfate, and barium sulfate, such titanates as barium titanate, and potassium titanate, and such phosphates as tribasic calcium phosphate, dibasic calcium phosphate, and monobasic calcium phosphate. Two or more of these may be used together to achieve a specific objective. As examples of organic particles, vinyl materials as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene may be used or contemplated.

The polyester resin layer preferably includes 50 to 100 ppm of a conductive metal compound, preferably manganese (Mg) and/or magnesium (Mn). The conductive metal compound can be added during the polymerization process as a catalyst or additive, or during the extrusion process in a masterbatch form to secure enough conductivity for electric pinning in the film-making process. Less than 50 ppm of the metal compound may cause pinning issues, more than 100 ppm of the metal compound may degrade the hydrolysis and transparency performance.

Examples of manganese compounds that may be used include manganese chloride, manganese bromide, manganese nitrate, manganese carbonate, manganese acetylacetonate, manganese acetate tetrahydrate, and manganese acetate dihydrate. Examples of magnesium compounds that may be used include magnesium chlorides and carboxylates. Magnesium acetate is a particularly preferred compound.

Additional additives, for example, phosphorous (P) can be used to suppress coloring (yellowness) of the polyester and can be added in an amount of between 30 to 100 ppm. Less than 30 ppm may not sufficiently reduce undesirable coloring of the film, but more than 100 ppm may make the film hazier.

The phosphorus-based compound is preferably a phosphoric acid-based compound, a phosphorous acid-based compound, a phosphonic acid-based compound, a phosphinic acid-based compound, a phosphine oxide-based compound, a phosphonous acid-based compound, a phosphinous acid-based compound, or a phosphine-based compound from the standpoint of thermal stability, suppression of debris, and improving hue. Phosphoric acid-based and phosphonic acid-based compounds are particularly preferable.

The bio-based crystalline polyester resin can be polymerized by polycondensation between two or more building blocks with diacid and diester functionality, at least one of which is plant-sourced. One process or method to produce such plant-sourced monomer, namely ethylene glycol, is to ferment sugar cane or other plant sugars and starches and distill into ethanol (CH3-CH2-OH). Through a dehydration process using mineral acids, strong organic acids, suitable catalysts and combinations thereof, the ethanol can be converted to ethylene monomer (CH2=CH2), which in turn can be oxidized into ethylene oxide

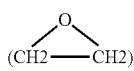

from which ethylene glycol (HO—CH2-CH2-OH) is derived by hydrolysis. One convenient low-cost source of sugar is the molasses generated as a by-product during the manufacture of sugar.

Diacids can also be derived from plant sources. For example there are several routes published for deriving terephthalic acid from biomass. Some of those routes are described in U.S. Patent Application Pub. No. 2009-0246430 A1: one route involves extracting limonene from at least one bio-based material (for example citrus fruit peels), converting the limonene to at least one terpene, converting the terpene to p-cymene, and oxidizing the p-cymene to terephthalic acid:

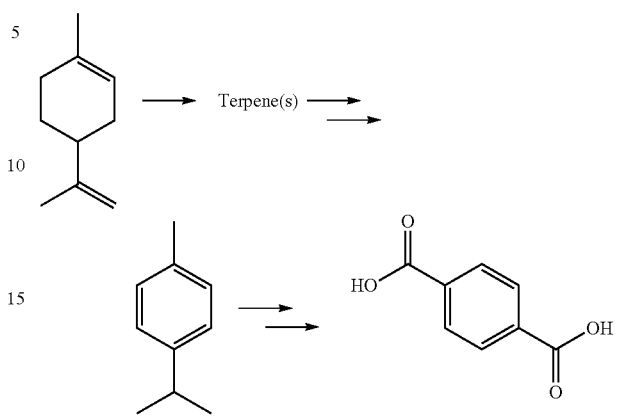

Another possible route to bio-terepththalic acid described in U.S. Patent Application Pub. No. 2009-0246430 A1 is through extraction of hydroxymethylfurfural from a bio-based material, such as corn syrup, sugars, or cellulose, converting hydroxymethylfurfural to a first intermediate, reacting the first intermediate with ethylene (which can also be derived from bio-sources such as described in paragraph 23) to form a second intermediate, treating the second intermediate with an acid in the presence of a catalyst to form hydroxymethyl benzaldehyde and oxidizing hydroxymethylbenzaldehyde to terephthalic acid:

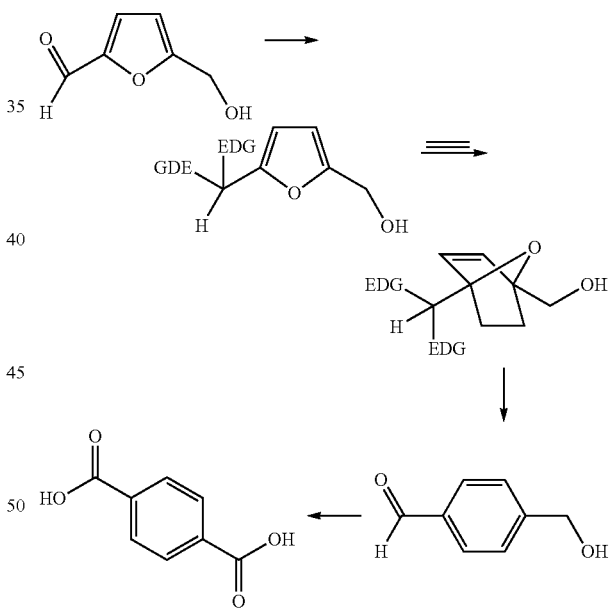

Another bio-derivative of plant-based hydroxymethylfurfural is 2,5-furandicarboxylic acid,

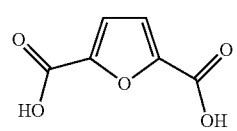 [SMILES: O=C(O)c1ccc(C(=O)O)o1]

(FDCA) derived by a catalytic oxidation.

FDCA can be used as the bio-diacid source for preparing polyester films. For example, condensation of FDCA with ethylene glycol provides polyethylene 2,5-furanedicarboxylate (PEF); preparation and physical properties of PEF are described by A. Gandini et al. (Journal of Polymer Science Part A: Polymer Chemistry Vol. 47, 295-298 (2009): its melting and crystallization behavior follow the same pattern as those of PET (i.e. a crystallization rate slow enough for its melt to be able to be quenched into the amorphous state but high enough to enable achieving high crystallinity by heating from amorphous or cooling from the melt; these attributes are essential for a drop-in adaptation in a PET-type biaxially oriented film manufacturing process), with a glass transition temperature (following quenching) at 75-80° C. and a melting temperature of 210° C. (45° C. lower than that of PET). A conference presentation by the Avantium Company ("Avantium's YXY: Green Materials and Fuels", 2$^{nd}$ Annual Bio-Based Chemicals Summit, Feb. 15, 2011) reports that PEF has been processed into bottles and film with superior gas and moisture barrier properties vs. PET; however, the presentation makes no mention of multilayer or laminated films containing PEF. Furthermore such a PEF film might exhibit, in view of its lower melting point, higher thermal shrinkage versus PET at the same temperature and this it may find application as a shrinkable label for a PET bottle. Today different polymeric materials are used as shrinkable labels, e.g. amorphous materials such as polystyrene, PVC, or PETG. The use of such materials makes the empty bottles difficult to recycle without removing the label first. However, a PEF label will not need to be removed prior to recycle, since the material can be crystallized and reprocessed similar to PET and—at the levels present (as label weight versus bottle weight)—will be compatible with PET and not expected to significantly affect the physical properties of the article derived from recycling and reprocessing. A bio-based PEF film material can have pMC ranging between about 80.6 and 107.5 depending on whether only the FDCA component or both the FDCA and EG are bio-sourced.

Another route towards bio-based terephthalic acid is through the intermediate preparation of trans, trans muconic acid

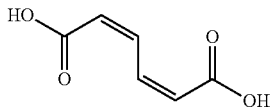

from biomass. A preparation method for cis, cis and cis, trans muconic acid from biomass (such as starches, sugars, plant material, etc.) through the biocatalytic conversion of glucose and others sugars contained therein, is described in U.S. Pat. No. 5,616,496. A subsequent isomerization of the above isomer mix into trans, trans muconic acid, necessary for conversion into terephthalic acid by reacting with dienophiles is described in U.S. Patent Application Pub. No. 2010-0314243.

Yet another route towards bio-based terephthalic acid is converting carbohydrates derived from corn or sugarcane and potentially from lignocellulosic biomass into bio-isobutanol via fermentation by employing appropriate yeasts. Such processes are described for example in U.S. Patent Application Pub. Nos. 2009-0226991 and 2011-0076733. The biologically-sourced isobutanol in turn is converted to para-xylene through a series of intermediate steps, according to procedures such as those described in U.S. Patent Application Publication No. 2011-0087000. The bio-sourced para-xylene in turn is oxidized to bio-terephthalic acid through commercially known oxidation/purification processes.

Layer B can also be blended with appropriate PET recycle. The recycle component can comprise self-recycle and/or external recycle. The external recycle can be partially bio-based, but does not have to be bio-based. The self-recycle originates from off-spec and trimmings from production or slitting of the same PET film grade in the same plant The external recycle originates from off-spec and trimmings from production or slitting of different PET film grades in the same plant. In some embodiments Layer B comprises at least 5 wt. %, at least 10 wt. %, at least 15 wt. % recycled polyester. Maximum recycle content is in some embodiments 50 wt. % or less than 50 wt. %, and in some embodiments 65% or less than 65 wt. %.

Other embodiments can comprise multi-layer base films in which each respective layer is comprised of a bio-based polyester of at least about 18, 19 or 21.5 pMC. For example, the layer B comprising a bio-based PET can have a contiguous skin layer A coextruded upon one side of layer B. If desired, a second skin layer C can be coextruded upon the side of layer B opposite the side in contact with layer A. It can be contemplated to interpose additional intermediate layers between the layers A and B and between B and C, in either symmetric or asymmetric structures. Preferably, all these additional layers—A, C, and intermediate layers—are comprised of bio-based polyester of at least about 18, 19, or 21.5 pMC.

These skin layers A and C can be coextruded on the respective sides of the core layer B, each skin layer having a thickness after biaxial orientation between 0.1 and 10 µm, preferably between 0.2 and 5 µm, and more preferably between 0.8 and 1.0 µm As mentioned previously, the outer layers A and C can include antiblock and slip additives for controlling COF and web handling. These are typically solid particles dispersed within the outer layer to produce a low coefficient of friction on the exposed surface of the outer layer(s). This low coefficient of friction helps the film to move smoothly through the film formation, stretching and wind-up operations. Without such antiblocking and slip additives, the outer surfaces would be more tacky and would more likely cause the film being fabricated to stick to itself and to processing equipment causing excessive production waste and low productivity.

Examples of antiblock and slip additives that may be used for polyester film applications silica particles with mean particle size diameters in the range of 0.0.1-5 µm at concentrations of 0.1-0.4 mass-percent, calcium carbonate particles with a medium particle size of 0.3-1.2 µm at concentrations of 0.03-0.2 mass-percent. Additional examples include inorganic particles, aluminum oxide, magnesium oxide, and titanium oxide, such complex oxides as kaolin, talc, and montmorillonite, such carbonates as calcium carbonate, and barium carbonate, such sulfates as calcium sulfate, and barium sulfate, such titanates as barium titanate, and potassium titanate, and such phosphates as tribasic calcium phosphate, dibasic calcium phosphate, and monobasic calcium phosphate. Two or more of these may be used together to achieve a specific objective. As examples of organic particles, vinyl materials as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene may be used or contemplated.

For the embodiments in which the biaxially oriented multilayer bio-based polyester film is PET-based, the coextrusion process may include a two- or three-layered compositing die. In the case where a three-layer die is employed, the bio-based polyester core layer B is sandwiched between the skin layer A and the skin layer C. In general, a preferred extrusion process for producing the polyester film, masterbatch and crystallizable polyester feed particles are dried (preferably less than 100 ppm moisture content) and fed to a melt processor, such as a mixing extruder. The molten material, including the additives, is extruded through a slot die at about 285° C. and quenched and electrostatically-pinned on a chill roll, whose temperature is about 20° C., in the form of a substantively amorphous prefilm. The film may then be reheated and stretched longitudinally and transversely; or transversely and longitudinally; or longitudinally, transversely, and again longitudinally and/or transversely. The preferred is sequential orientation of first longitudinally, then transversely. The stretching temperatures are generally above the Tg of the film polymer by about 10 to 60° C.; typical machine direction processing temperature is about 95° C. Preferably, the longitudinal stretching ratio is from 2 to 7, from 2 to 6, more preferably from 3 to 4.5, with typical transverse direction processing temperature about 110° C. Preferably, the transverse stretching ratio is from 2 to 5, more preferably from 3 to 4.5. Preferably, any second longitudinal or transverse stretching is carried out at a ratio of from 1.1 to 5. The first longitudinal stretching may also be carried out at the same time as the transverse stretching (simultaneous stretching). Heat setting of the film may follow at an oven temperature of about 180 to 260° C., preferably about 220 to 250° C., typically at 230° C., with a 5% relaxation to produce a thermally dimensionally stable film with minimal shrinkage. The film may then be cooled and wound up into roll form.

As described previously, one or both sides of the film can be coated or treated for adhesion promotion, surface conductivity, higher wetting tension, non-sticking etc. Preferred treatments include known methods such as corona treatment, plasma treatment, flame treatment, corona treatment in a controlled atmosphere of gases, and in-line coating methods.

The overall thickness of the multilayer dye transfer film is preferably about 0.5 to about 10 µm, and more preferably about 1 to about 6 µm. There is a recent trend toward reduced printer size and increased printing speed. Very thin dye transfer film, preferably as thin as practicable, is more compatible in such conditions and is especially desirable. Usually it is difficult to produce a polyethylene terephthalate film less than 1.5 µm thick. Polyethylene-2,6-naphthalate film has higher strength than the polyethylene terephthalate film and therefore can be made with a thickness as little as about 0.5 µm. Consequently polyethylene-2,6-naphthalate can be used for the base layer polyester component, particularly for end use applications that demand a very thin film. The Polyethylene-2,6-naphthalate can be also partially-biobased, if the ethyleneglycol component is derived from plant sources. If the thickness of the film is larger than 10 µm, the film tends to reduce heat conductivity for sublimation dye transfer and thereby limits printing speed.

An adhesive layer can be applied to the polyester base film during biaxial stretching. Preferably, the adhesive components will be dissolved or dispersed in a liquid. Preferably the liquid is water. The adhesive solution or dispersion can be applied by conventional techniques such as dip, roller, rod, spray, paint or doctor blade methods, to name a few examples. After application, the liquid can be removed by conventional drying methods, including heat and vacuum, for example, to leave a dry coating of adhesive on the base film. Preferably, the adhesive solution or dispersion is applied to the surface of the film after machine direction stretching and before transverse direction stretching. The once-stretched film with adhesive deposited thereon then conveniently enters a zone, typically an oven, in which temperature is controlled while transverse direction stretching occurs. During this second stretching step and optional relaxation, heating of the film not only appropriately treats the polyester but also conveniently dries residual liquid from the adhesive solution/dispersion and thermally activates crosslinking of the adhesive components. Alternatively, the adhesive can be applied to the polyester base film after biaxial stretching and optional relaxation have taken place.

U.S. Pat. No. 6,303,228, the contents of which are hereby incorporated by reference in its entirety, describe adhesive layers that may be used in some embodiments. These adhesive layers may include at least one water-soluble or water-dispersible resin selected from the group consisting of a urethane resin, polyester resin, acrylic resin and vinyl resin-modified polyester on the surface of its ink layer side. This coating layer is preferable because it enhances adhesion between an ink layer comprising a sublimating dye and a resin binder and a polyester base film substrate. The coating layer may also be formed from an epoxy resin, melamine resin, oxazoline resin, vinyl resin or polyether resin. Detailed description and specific examples of adhesive resins are provided by U.S. Pat. No. 6,303,228 by Watanabe et al., the disclosure of which is hereby incorporated by reference in its entirety.

A substrate composite film produced in the continuous orienting process, without an ink layer, can be wound-up in wide rolls, packaged, and stored. This film can be subsequently processed by applying an ink layer on one surface and a low friction coating on the other surface. If the substrate composite film is coated in the continuous orienting line with an adhesive layer, the preferred surface for ink deposition is upon this adhesive layer. Preferably, the color dye components will be dissolved or dispersed in a liquid. Preferably, the liquid is a solvent such as an acetone, methylethylketone (MEK), toluene, N-methylpyrrolidone (NMP) or isopropyl alcohol. In some embodiments, is acetone or MEK. The color dye solution or dispersion can be applied by conventional techniques such as Meyer rod or gravure cylinder coater machines. Preferably, a gravure cylinder coating method is used. After application, the liquid can be removed by conventional drying methods, including heat and vacuum, for example, to leave a dry coating of color dye on the base film or upon the adhesive layer.

The substrate composite film, when subsequently coated with a color dye layer for purposes of thermal transfer image production, has better performance against film wrinkling interfering with image quality, and prevents excessive printing machine print head abrasion, when a low friction silicone or wax based layer is applied to the opposite side of the color dye layer. Preferably, the low friction components will be dissolved or dispersed in an aqueous or solvent based solution. Preferably the solution is a solvent such as an acetone, methylethylketone (MEK), toluene, N-methylpyrrolidone (NMP) or isopropyl alcohol. More preferably, the solvent is acetone or MEK. The low friction solution or dispersion can be applied by conventional techniques such as Meyer rod or gravure cylinder coater machines. Preferably gravure cylinder coating method is used. After application, the liquid can be removed by conventional drying methods, including heat and vacuum, for example, to leave a dry coating of low friction on the base film. The low friction layer can be applied to the base film either before or after the color dye layer is applied; and either applied in a separate process than the color dye application process or in the same process in a multi-stage coating machine. Preferably, the low friction layer is applied before the color dye layer is applied. More preferably, the low friction layer is applied in the same process as the color dye application in a multi-stage coating machine.

Film Properties

Radiocarbon/biomass content pMC can be measured substantially in accordance with ASTM D6866-10 "Renewable Carbon Testing" procedure. Analytical methods used to measure $^{14}C$ content of respective bio-based and petroleum-based polyolefin materials and articles made include Liquid Scintillation Counting (LSC), Accelerator Mass Spectrometry (AMS), and Isotope Ratio Mass Spectroscopy (IRMS) techniques. Bio-based content is calculated by deriving a ratio of the amount of radiocarbon in the article of interest to that of the modern reference standard. This ratio is reported as a percentage of contemporary radiocarbon (pMC or percent modern carbon) and correlates directly to the amount of biomass material present in the article.

Intrinsic viscosity (IV) of the film and resin can be tested according to ASTM D 460.

This test method is for the determination of the inherent viscosity of poly(ethylene terephthalate) (PET) soluble at 0.50% concentration in a 60/40 phenol/1,1,2,2-tetrachloroethane solution by means of a glass capillary viscometer. Films prepared according to the described methods may have an IV of 0.63 to 0.75, which is considered good for film. More preferable 0.63 to 0.70, even more preferable 0.63 to 0.68.

Tensile strength and elongation percent at break of the film can be determined according to ASTM D882 using a Tensilon tester. The average of five measurements along the machine direction and the average of five measurements along the transverse direction are used. The preferable range for tensile strength at break along the machine direction is 35,000 to 60,000 lb/in$^2$, more preferable 40,000 to 55,000, most preferable 43,000 to 50,000. The preferable range for tensile strength at break along the transverse direction is 26,000 to 50,000 lb/in$^2$, more preferably 31,000 to 45,000, most preferably 35,000 to 40,000. The preferable range for elongation at break along the machine direction is 55 to 145%, more preferably 75 to 125, most preferably 85 to 105. The preferable range for elongation at break along the transverse direction is 90 to 160%, more preferably 90 to 140, most preferably 95 to 120.

Winding capability during film production can be assessed as follows: a continuously manufactured mill roll of film from a continuous production line was subsequently slit to widths of 1400 mm to 1600 mm and the slit film was wound in 315 m/minute to lengths of 20,000 m to 60,000 m. It can be evaluated by the following standard. "Excellent": no wrinkle during winding the film or in any finished roll formation. "Allowable": there were some wrinkles at the start or during winding, but the wrinkles disappeared and did not remain in finished roll formation. "Unacceptable": there were some wrinkles during winding and/or remained in finished roll formation. The preferable performance rating is "Allowable", more preferably "Allowable" to "Excellent", even more preferable "Excellent".

The values of Coefficient of static and dynamic friction (COF) can be measured using a calibrated friction meter conforming to ASTM D 1894. For general (untreated with antistick coating) TTR film, the preferable range for static COF is 0.40 to 0.70, more preferable. 0.42 to 0.65, most preferable 0.45 to 0.55. For TTR film treated with antistick coating, the preferable range for static COF is 0.15 to 0.25, more preferable. 0.16 to 0.22, most preferable 0.17 to 0.20. For general (untreated with antistick coating) TTR film, the preferable range for dynamic COF is 0.35 to 0.65, more preferably 0.37 to 0.60, most preferably 0.40 to 0.50. For TTR film treated with antistick coating, the preferable range for static COF is 0.10 to 0.20, more preferably 0.12 to 0.18, most preferably 0.13 to 0.17.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

We claim:

1. A film for thermal transfer printing comprising:
   a biaxially oriented base film comprising polyester, wherein the polyester in the base film comprises bio-based polyester and has a radiocarbon content of at least 12 pMC, wherein the film is a thermal transfer ribbon for carrying inks or dyes used in thermal transfer printing and the film has a thickness of 0.5-10 μm.

2. The film of claim 1, wherein the base film is a single layer film.

3. The film of claim 1, wherein the base film is a multilayer film.

4. The film of claim 1, wherein the base film comprises crystalline polyethylene terephthalate.

5. The film of claim 4, wherein the polyester has a radiocarbon content of at least 18 pMC.

6. The film of claim 1, wherein the base film comprises recycled polyester.

7. The film of claim 1, further comprising an adhesive layer on a surface of the base film.

8. The film of claim 7, further comprising a colored dye coating on the adhesive layer.

9. The film of claim 7, further comprising a low friction coating on a surface of the base layer opposite the adhesive layer.

10. The film of claim 1, wherein the base film comprises a first type of lubricant particle.

11. The film of claim 10, wherein the base film comprises a second type of lubricant particle.

12. The film of claim 1, wherein the base film comprises at least two layers comprising at least partially bio-based polyester.

13. A film structure for thermal transfer printing comprising:
   a biaxially oriented base film comprising at least partially bio-based polyester, a first type of lubricant particles, and a second type of lubricant particles;
   an adhesive layer on a surface of the base film;
   a colored dye coating on the adhesive layer; and a low friction coating on a surface of the biaxally oriented base layer opposite the adhesive layer, wherein the film structure is a thermal transfer ribbon for carrying inks or dyes used in thermal transfer printing and the film structure has a thickness of 0.5-10 μm.

14. The film structure of claim 13, wherein the base film is a single layer film.

15. The film structure of claim 13, wherein the base film is a multilayer film.

16. The film structure of claim 13, wherein the base film comprises crystalline polyethylene terephthalate.

17. The film structure of claim 13, wherein the biaxially oriented base film comprises recycled polyester.

18. A method of making a film for thermal transfer printing comprising:
   extruding a base film comprising polyester, wherein the polyester in the base film is comprises bio-based polyester and has a radiocarbon content of at least 12 pMC; and
   biaxially orienting the base film, wherein the film is a thermal transfer ribbon for carrying inks or dyes used in thermal transfer printing and the film has a thickness of 0.5-10 μm.

19. The method of claim 18, wherein the base film is extruded as a single layer film.

20. The method of claim 18, wherein the base film is coextruded as a multilayer film.

21. The method of claim 18, wherein the base film comprises crystalline polyethylene terephthalate.

22. The method of claim 18, wherein the base film comprises recycled polyester.

23. The method claim 18, comprising applying an adhesive layer as a solution or dispersion to a surface of the base film.

24. The method of claim 23, comprising applying a colored dye coating onto the adhesive layer.

25. The method of claim 23, comprising applying a low friction coating on a surface of the base layer opposite the adhesive layer.

26. The method of film of claim 18, wherein biaxially orienting the base film comprises stretching the base film from 2 to 7 times in a longitudinal direction and from 2 to 5 times in a transverse direction.

* * * * *

UNITED STATES PATENT AND TRADEMARK OFFICE
CERTIFICATE OF CORRECTION

| | | |
|---|---|---|
| PATENT NO. | : 9,561,676 B2 | Page 1 of 1 |
| APPLICATION NO. | : 14/139434 | |
| DATED | : February 7, 2017 | |
| INVENTOR(S) | : Stefanos L. Sakellarides | |

It is certified that error appears in the above-identified patent and that said Letters Patent is hereby corrected as shown below:

In the Claims

At Column 15, Claim number 13, Line number 1:
Delete "biaxally" and insert --biaxially--.

At Column 15, Claim number 18, Line number 17:
Delete "is".

At Column 16, Claim number 26, Line number 17:
Delete "film of".

Signed and Sealed this
Twenty-ninth Day of May, 2018

Andrei Iancu
*Director of the United States Patent and Trademark Office*